United States Patent Office 3,726,845
Patented Apr. 10, 1973

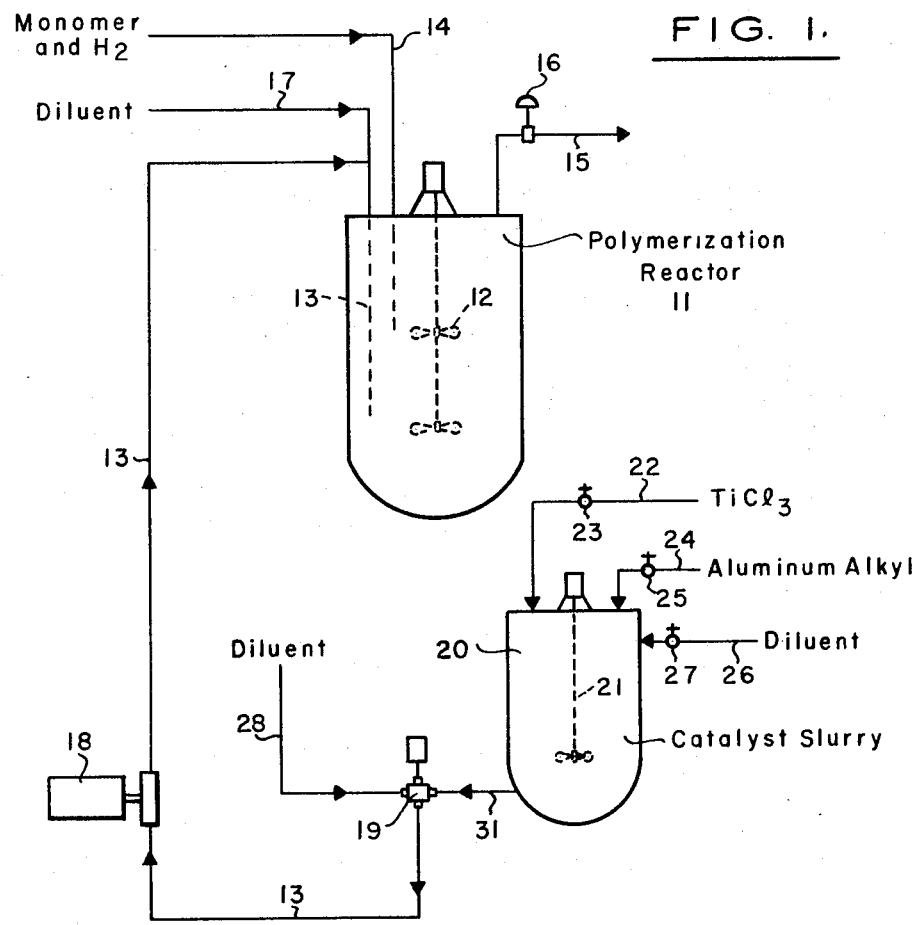
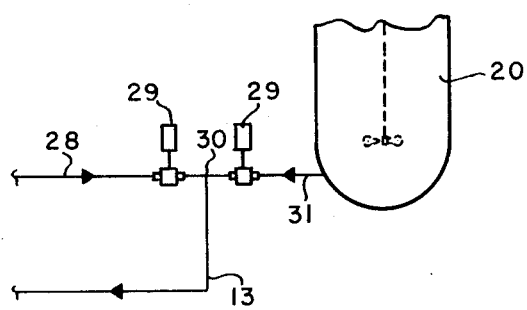

---

3,726,845
SUPPLYING CATALYST TO A REACTION ZONE
James K. Nickerson, Baytown, Tex., assignor to Esso
Research and Engineering Company
Filed Mar. 22, 1971, Ser. No. 126,804
Int. Cl. C08f 1/42, 3/06, 3/08
U.S. Cl. 260—85.3 R    10 Claims

ABSTRACT OF THE DISCLOSURE

In the polymerization of alpha mono-olefins with a catalyst which tends to clog lines and pumps and wherein a diluent for the reaction is employed, the catalyst line and pump are maintained clean and free of catalyst deposits by alternately flowing or supplying catalyst and diluent as separate streams through said catalyst line and pump which also allows catalyst supply to be controlled.

BACKGROUND OF THE INVENTION

(1) Field of the invention

The present invention is directed to the polymerization of alpha mono-olefins and to the suuply of catalyst thereto. More particularly the invention is directed to maintenance of catalyst supply lines and pumps in a clean condition in the polymerization of alpha mono-olefin in a reaction zone. In its more specific aspects, the invention is concerned with the alternate flow of catalyst and diluent to an alpha mono-olefin reaction zone whereby the lines and pump through which they flow are maintained clean and catalyst supply is controlled.

(2) Description of the prior art

It is known to polymerize alpha mono-olefins to form solid polymers and copolymers using various catalysts, among which the more popular are the Ziegler, catalysts, although other catalysts are used commercially. In employing these catalysts it has been customary to inject into a reaction zone the catalyst as a slurry in a diluent and to introduce also the alpha mono-olefin being polymerized. Injection of the catalyst slurry in a diluent has been difficult in that control of the amount of catalyst used has been difficult and the catalyst has tended to clog catalyst injection means such as pumps and the like and lines carrying the slurry. In accordance with the present invention it has been found that these problems may be diluent free of catalyst into the recation zone such that the catalyst pumps and lines are maintained free or unclogged by catalyst which tends to deposit and thus control accurately the amount of catalyst introduced into the reaction zone, which is new, unobvious, and patentable. The following U.S. patents were considered in connection with this invention:

2,082,519
2,245,733
2,692,261
2,886,616
2,889,314
3,004,086
3,198,605

SUMMARY OF THE INVENTION

The present invention is directed to the polymerization of alpha mono-olefins wherein a slurry of catalyst and diluent are alternately fed into a reaction zone where contact is made between the catalyst, diluent and feed. The invention involves the supply and control of the amount of catalyst and the maintenance of the catalyst line and pump free of catalyst by alternately feeding catalyst slurry and diluent to the reaction zone allowing careful control of the amount of catalyst and control of the cleanliness of equipment such as, but not limited to, lines and pumps and freedom from clogging which was heretofore encountered.

VARIABLES OF THE INVENTION

The catalyst is suitably a slurry of titanium trichloride and an alkyl aluminum compound such as aluminum trialkyl or titanium trichloride and dialkyl aluminum chloride in a suitable diluent. The catalyst may be $$TiCl_3 \cdot \tfrac{1}{3} AlCl_3$$

slurried in a diluent containing dialkyl aluminum chloride. Likewise, the catalyst may be a catalyst of the type disclosed in the Moon U.S. Pat. 3,004,086 or one such as described by Fritz in his U.S. Pat. 2,889,314. Various methods exist for making up these catalysts and it is intended that the present invention involves the use of the Ziegler catalysts and those described by Hogan et al. in U.S. 2,825,721 as well as others of a similar type.

The diluent may be a paraffinic or aromatic hydrocarbon such as one described in the aforementioned patents. Preferably the diluent is a mono-cyclic aromatic or paraffinic hydrocarbon boiling from about 85° to 750° F. Aromatic hydrocarbons or halogenated aromatic hydrocarbons having 6 to 8 carbon atoms in the molecule preferably xylenes and paraffinic hydrocarbons having 5 to 10 carbon atoms, preferably pentane or hexane, may be used. White oils are also suitable as diluents for the reaction and for slurry the catalyst.

The time for catalyst slurry injection into the reaction zone may vary from about 1 second to about 5 minutes while the time for diluent injection may range from about 10 seconds to about 5 minutes. Injection times of about 3 seconds to about 1 minute for catalysts injection and from about 1 to about 2 minutes for diluent are preferred.

The type of recator employed may be one as disclosed in the Fritiz Pat. U.S. 2,889,314, a stirred autoclave or pot, a loop type reactor or one of the draft tube type such as used in butyl rubber polymerization reactions.

The feed alpha mono-olefins may be ethylene, propylene, butylenes, pentylenes, or butadiene, pentadenie, isoprene, and the like or mixtures of the alpha mono-olefins such as but not limited to ethylene and propylene or butadiene and an alpha mono-olefin such as ethylene or propylene.

The amount of diluent, feed, and catalyst may vary. Usually weight ratios of diluent to feed of about 0.1 to about 3 may be used. The amount of catalyst may range from about .001 to about 0.1 wt. percent of the feed.

BRIEF DESCRIPTION OF THE DRAWING

The present invention will be further described by reference to the drawing in which:

FIG. 1 is a flow diagram of one mode of practicing the invention, and

FIG. 2 is a showing of use of two 2-way valves in lieu of the 3-way valve of FIG. 1.

DESCRIPTION OF THE PREFERRED EMBODIMENTS WITH REFERENCE TO THE DRAWING

Referring now to the drawing, numeral 11 designates a polymerization reactor fitted with a stirring means 12 and lines 13, 14, and 15. Line 15 has a valve 16 and serves as an outlet for the product. Line 14 is an inlet line for the feed which may be an alpha mono-olefin such as ethylene or propylene, containing hydrogen, and line 13 is a line through which catalyst slurry and diluent are supplied. Line 17 connects to line 13 for supply of diluent. Line 13 contains a pump 18 which is a metering pump and in turn connects to two 2-way or one 3-way valve 19.

The catalyst slurry vessel 20 is provided with a stirring or mixing means 21 and has an inlet system 22 provided with control means 23 for supply of titanium trichloride, line 24 controlled by valve 25 for supply of aluminum alkyl and line 26 controlled by valve 27 through which diluent may be introduced. $TiCl_3$ is a solid. It comes in drums or other such containers and appropriate systems are used to get it from containers into catalyst vessels. Valve 19 is two 2-way or one 3-way valve and when it is a 3-way valve line 28 connected to a source of diluent. When two 2-way valves are used valves 29 in line 30 are employed.

The present invention operates as follows: titanium trichloride, aluminum alkyl such as diethylaluminum chloride, and diluent which may be a xylene or pentane or hexane is admitted into the stirred vessel 20. After the catalyst slurry has been formed in the vessel 20 the catalyst slurry is withdrawn by way of line 31 connecting to valve 19 and thence through line 13, metering pump 18, flows through line 13 and thence into polymerization reactor 11 where it is contacted with the alpha mono-olefin which is ethylene or propylene. The polymerization reactor 11 may be operated at a temperature ranging from about 100° to about 450° F. but preferably operates at about 160° F. The catalyst slurry formed in vessel 20 is alternately fed through line 31, valve 19, and line 13 into polymerization reactor 11 with diluent supplied by line 28 by flowing catalyst for a selected number of seconds and then diluent for a selected number of seconds. The metering pump designated by numeral 18 and the line 13 as well as the valve 19 are thus kept free of the catalyst slurry which tends to deposit and clog the lines and the metering pump. By operation in accordance with the present invention the lines are kept free of clogging by the diluent flowing through the lines after the catalyst for a selected number of seconds and then flowing catalyst for a selected number of seconds within the ranges given.

The present invention has been proven to be effective. In the following table is a log of difficulties which are obtained in a small plant immediately prior to installation of the present invention.

Day 1 (4:00 p.m.) _____ Having trouble holding Ti-Cat rate.
Day 1 (9:45 a.m.) _____ TiCat pump won't pump but 5 volumes of cat with full pump rate, call for machinist.
Day 2 (10:00 p.m.) ____ TiCat pump rate drops off every once in a while.
Day 2 (10:35 p.m.) ____ Upon checking TiCat rate, it was found we didn't have any (rate).
Day 3 (1:30 p.m.) _____ TiCat pump rate has been erratic today.
Day 4 (1:40 p.m.) _____ Machinist put in a new diaphragm and cleaned checks on the TiCat pump.
About 3 weeks afterward: Machinist worked on TiCat
(3:30 p.m.) _____ pump.
(7:30 a.m.) _____ TiCat pump not pumping. Shutting unit down. Having to wait on machinist. (Shut-in runaway resulted.)

Then two days later the present invention was installed and not a single entry concerning failure of the pump is found in the operator's log book from that date through the next three months whereafter the records were not examined.

Prior to the installation of the present invention where catalyst slurry and diluent were alternately flowed through the metering system and lines, it was necessary for a machinist to work on the catalyst system for about three weeks before installation of the present invention two days later.

Long steady runs with no deterioration in product quality or catalyst efficiency have been completed in this plant by premixing the titanium catalyst slurry with diethylaluminum chloride and with overflow of the slurry from the reactor and flowing the catalyst slurry and diluent followed by catalyst and catalyst followed by diluent. This may contrast with a run A in which the heptane insoluble content of polypropylene decreased from 93.7 to 84.8% and catalyst efficiency decreased from 1450 to 850 in an 11-day run. The alkyl aluminum and titanium catalyst were fed separately and alternately and mixed at the reactor in that run and the slurry was withdrawn from the bottom of the reactor through a settling chamber. Current steady operations were obtained in a run B and average good results were obtained in five runs. Runs C and B which followed covered 11 days of continuous operations and runs D, E, and F 12 days of operation without degradation of product quality. Thus, it is quite important and useful in the present invention to alternate the flow of catalyst slurry with diluent so as to maintain the catalyst line clean and free of catalyst deposition. Thus, the flow of catalyst and amount of catalyst may be carefully controlled.

The present invention allows the obtaining of quite useful and unobvious results which heretofore were unobtainable.

The nature and objects of the present invention having been completely described and illustrated, and the best modes contemplated set forth, what I wish to claim as new and useful and secure by Letters Patent is:

1. A method of supplying catalyst to a polymerization reaction zone wherein alpha mono-olefins are polymerized in a reaction zone by contact with a Ziegler catalyst slurry which tends to clog the catalyst line and pump and wherein a liquid hydrocarbon diluent for said reaction is employed, the improvement which comprises alternately supplying separate streams of catalyst slurry and diluent to said reaction zone through said line and pump wherein said line and pump are maintained in a clean condition and wherein the amount of catalyst supplied is controlled, the catalyst slurry being supplied for a time in the range from about 1 second to about 300 seconds.

2. A method in accordance with claim 1 in which the diluent is supplied for a time of about 60 to about 120 seconds.

3. A method in accordance with claim 1 in which the diluent is a liquid hydrocarbon and the Ziegler catalyst is titanium trichloride and an alkyl aluminum halide.

4. A method in accordance with claim 3 in which the diluent is a pentane.

5. A method in accordance with claim 3 in which the alkyl aluminum halide is diethyl aluminum chloride.

6. A method in accordance with claim 1 in which the diluent is a mono-cyclic aromatic hydrocarbon having 6 to 8 carbon atoms in the molecule and the catalyst is titanium trichloride and an alkyl aluminum halide.

7. A method in accordance with claim 6 in which the diluent is a xylene.

8. A method in accordance with claim 6 in which the alkyl aluminum halide is diethyl aluminum chloride.

9. A method in accordance with claim 1 in which the diluent boils within the range of about 86° to about 750° F.

10. A method in accordance with claim 1 in which the diluent is a paraffin hydrocarbon having 5 to 10 carbon atoms in the molecule.

References Cited
UNITED STATES PATENTS 3,008,938   11/1961   Irvin _____ 260—94.9 P
3,280,090   10/1966   Scoggin _____ 260—94.9 P JAMES A. SEIDLECK, Primary Examiner A. HOLLER, Assistant Examiner U.S. Cl. X.R.

260—88.2 B, 93.7, 94.3, 94.9 B